(12) United States Patent
Taylor et al.

(10) Patent No.: US 9,247,335 B2
(45) Date of Patent: Jan. 26, 2016

(54) SEALING WIRING HOLES IN ELECTRONIC DEVICES

(71) Applicant: Bose Corporation, Framingham, MA (US)

(72) Inventors: Tristan Edward Taylor, Boston, MA (US); Aaron Michael Reich, Napa, CA (US)

(73) Assignee: Bose Corporation, Framingham, MA (US)

( * ) Notice: Subject to any disclaimer, the term of this patent is extended or adjusted under 35 U.S.C. 154(b) by 303 days.

(21) Appl. No.: 13/826,430

(22) Filed: Mar. 14, 2013

(65) Prior Publication Data

US 2014/0270221 A1    Sep. 18, 2014

(51) Int. Cl.
*H02G 3/22* (2006.01)
*H04R 1/10* (2006.01)
*H02G 3/08* (2006.01)

(52) U.S. Cl.
CPC .............. *H04R 1/1033* (2013.01); *H02G 3/22* (2013.01); *H02G 3/083* (2013.01); *H02G 3/088* (2013.01); *Y10T 29/49117* (2015.01)

(58) Field of Classification Search
CPC .............. F16L 5/00; F16L 5/10; F16L 5/02; H02G 15/00; H02G 15/013; H02G 15/046; H02G 3/22; H02G 3/26; H02G 3/083; H02G 3/088; Y10T 16/063; Y10T 16/05; Y10T 29/49117; H04R 1/10; H04R 1/1033; H04R 1/1058; H04R 1/1066; B60R 16/0207; B60R 16/0215; B60R 16/0222

USPC ............................ 381/71.6, 309, 74, 370–384
See application file for complete search history.

(56) References Cited

U.S. PATENT DOCUMENTS

| | | | | |
|---|---|---|---|---|
| 5,531,459 | A * | 7/1996 | Fukuda et al. | 277/606 |
| 6,058,562 | A * | 5/2000 | Satou et al. | 16/2.1 |
| 6,119,305 | A * | 9/2000 | Loveall et al. | 16/2.2 |
| 6,211,464 | B1 * | 4/2001 | Mochizuki et al. | 174/659 |
| 6,486,400 | B1 * | 11/2002 | Smutny et al. | 174/651 |
| 6,967,285 | B2 * | 11/2005 | Sanroma et al. | 174/668 |
| 7,582,836 | B2 * | 9/2009 | Tapper | 174/650 |
| 8,033,408 | B2 * | 10/2011 | Makela et al. | 220/3.2 |
| 8,609,990 | B2 * | 12/2013 | Levi | 174/152 G |
| 2002/0038492 | A1 * | 4/2002 | Hashimoto | B60R 16/0222 16/2.1 |
| 2005/0139381 | A1 * | 6/2005 | Sanroma | B60R 16/0222 174/152 R |
| 2012/0314882 | A1 * | 12/2012 | Sibbald | 381/71.6 |

* cited by examiner

*Primary Examiner* — Vivian Chin
*Assistant Examiner* — Jason R Kurr

(57) ABSTRACT

A wall separates a first volume from a second volume and has a hole allowing passage between the first volume and the second volume. A wire passes through the hole, and a gasket surrounds the wire at the hole. The gasket includes a first section including a groove between a first flange and a second flange, the groove has an outer diameter matched to the diameter of the hole and the flanges have outer diameters greater than the diameter of the hole. A second section adjacent the first flange includes a tubular portion having a diameter less than the diameter of the hole and a tapered section smoothly transitioning from the diameter of the tubular portion to the diameter of the first flange. The gasket prevents flow of fluid through the hole between the first volume and the second volume.

10 Claims, 6 Drawing Sheets

SEALING WIRING HOLES IN ELECTRONIC DEVICES

BACKGROUND

This disclosure relates to sealing holes through which wires pass in electronic devices.

Electronic devices often include walls or partitions through which wires must pass, but which need to be sealed against the passage other materials, mainly air or water. In particular, headphones, and especially active noise-reducing headphones include two, three, or more discrete chambers, each including electronics that must be interconnected, but these chambers need to be acoustically sealed from each other and, at least some of them, from the environment. As shown in FIG. 10, a typical active noise reducing headset 10 has four sections: a front cavity 12 that couples to the user's head 14 with a cushion 16 and contains a feedback microphone 18, a rear cavity 20 that surrounds the back side of an electroacoustic transducer 22 (also called a driver or speaker), a feed-forward microphone cavity 24 that houses a microphone 26 coupled to the environment 28, and an electronics cavity 30 that houses the active noise reduction circuit 32 and power supply 34. There may be more or fewer cavities, depending on the features and architecture of the headphone.

It is particularly important that acoustic paths into and between the front and rear cavities be controlled. The rear cavity 20 contains a specific volume of air, the stiffness of which applied an acoustic impedance to movement of the diaphragm of the transducer 22. As described in U.S. Pat. No. 6,831,984, incorporated here by reference, the rear cavity 20 may be coupled to the environment through precisely designed resistive and reactive ports (not shown). In other examples, the back cavity is entirely sealed. In either case, a hole 40 may be necessary in the cavity wall to allow wires 42 to pass from the transducer 22 to the other electronics 32. In some examples, as shown in FIG. 10, a feed-forward microphone 26 is housed in a recess in the wall of the back cavity. The wires 44 from the microphone to the electronics may pass through a hole 46 in the wall separating the back cavity from the microphone recess, and through another hole 48 in the wall of the back cavity, to the electronics.

The front cavity 12 contains another volume of air, which couples sound from the transducer 22 to the ear canal 50, and it contains the feedback microphone 18, if one is used. Variability of the ear canal 50 and the seal formed between the cushion 16 and the head 14 mean that the volume of the front cavity 12 is not fixed, and leaks may exist between the cushion and the head, but it has been shown that providing another, known and controlled leak path (not shown) that is greater than the typical seal-to-head leak, can allow the headphone design to compensate for some of the variability. As with the back cavity, a hole 52 in the front cavity wall allows wires 54 to pass from the feedback microphone 18 and, in some cases, from the transducer, to the other electronics 32. In some designs, a hole 56 of known size is intentionally provided between the front and back cavities to avoid overpressure situations from damaging the transducer. Again, the specific size of the hole is important to the proper operation of the headphones.

These various wiring holes serve as additional, uncontrolled acoustic leak paths out of the front or back cavity or between them. Similar issues exist in waterproof electronics, where holes must be provided to get wires out of sealed compartments. To avoid such problems, as shown in FIG. 11 for an example headphone 60, the wiring holes are generally sealed with a sealant 62 such as room temperature vulcanizing (RTV) silicone. RTV presents numerous problems in the assembly of headphones. It takes time to cure, sometimes as much as 90 minutes, which delays the total assembly of the product, and causes any rework that requires re-seating the wires to take even more time. RTV also binds the wires, such that they cannot be pulled back through the hole, such as to adjust their length, once it has cured. RTV may also generally be messy to use and clean up. Other sealing techniques, such as expanding foam, are also difficult to work with and may provide inconsistent results. Note that while the use of RTV to seal the holes is prior art as shown in FIG. 11, the actual headphone shown in FIG. 11 is not prior art.

SUMMARY

In general, in one aspect, an enclosure has a wall separating a first volume from a second volume, the wall defines a hole having a diameter and allowing passage between the first volume and the second volume. A wire passes through the hole, and a gasket surrounds the wire at the hole. The gasket includes a first section including a groove between a first flange and a second flange, the groove having an outer diameter matched to the diameter of the hole and the flanges having outer diameters greater than the diameter of the hole, and a second section adjacent the first flange and including a tubular portion having a diameter less than the diameter of the hole, and a tapered section smoothly transitioning from the diameter of the tubular portion to the diameter of the first flange. A bore passes through the first and second sections and has an inner diameter matched to the diameter of the wire. The gasket prevents flow of fluid through the hole between the first volume and the second volume.

Implementations may include one or more of the following, in any combination. The gasket may prevent the flow of air through the hole. The gasket may prevent the flow of water through the hole. The gasket may have a hardness of 50 Shore A. The outer diameter of the groove may be greater than the diameter of the hole. The diameter of the bore and the coefficient of friction between the gasket and the wire may be such that before being positioned in the hole, the force required to pull the wire through the gasket is more than the force required to pull the tapered section and the first flange of the gasket through the hole. The diameter of the bore, the outer diameter of the groove, and the coefficient of friction between the gasket and the wire may be such that when positioned in the hole, the force required to pull the wire through the gasket is less than the force required to pull the second flange of the gasket through the hole.

The enclosure may include the body of a headphone, first volume may be a back cavity of the headphone containing the back side of an acoustic driver, and the outer diameter of the groove and the coefficient of friction between the gasket and the side wall of the hole may be such that when the gasket is positioned in the hole, the force required to push the second flange of the gasket through the hole is greater than the acoustic pressures produced inside the first volume by operation of the acoustic driver. The enclosure comprises the body of an active noise reducing headphone having an acoustic driver, and the first volume may be a back cavity containing a first side of the acoustic driver, while the second volume may be open to free space around the headphones. The enclosure may include the body of an active noise reducing headphone having an acoustic driver, and the first volume may be a back cavity containing a first side of the acoustic driver, while the second volume is a front cavity coupling a second side of the acoustic driver to the ear of a user when the headphones are worn. The enclosure may include the body of an active noise reducing headphone having an acoustic driver, and the first volume may be a front cavity coupling a first side of the acoustic driver to the ear of a user when the headphones are worn, while the second volume is open to free space around the headphones. The enclosure may include a water-tight case for a mobile electronic device, the first volume being the interior of the case, and the second volume being free space around the case.

In general, in one aspect, a method of assembling an electronic device includes molding a gasket in place around a wire, pulling the gasket partially through a hole in a first casing of the electronic device such that the gasket seals the hole, connecting a first end of the wire to a circuit of the electronic device, attaching the first casing to a second casing to enclose the circuit, and pulling a section of the wire including a second end through the gasket to remove slack from the wire inside the space enclosed by the first casing.

In general, in one aspect, a gasket for sealing a wiring hole includes a first section having a first flange having a first diameter and a second flange having a second diameter, the flanges defining a groove between them having a third diameter less than either of the first and second diameters and a second section having a tubular portion extending from the second flange and having a fourth diameter less than the third diameter, and a flared portion at an end of the tubular portion adjacent the second flange, the flared portion transitioning from the fourth diameter at the tubular section to the second diameter at the second flange. A bore goes through the first section and the second section.

Implementations may include one or more of the following. Advantages include faster and more reliable assembly, products that are easier to re-work during or after assembly, and a more reliable and consistent seal.

All examples and features mentioned above can be combined in any technically possible way. Other features and advantages will be apparent from the description and the claims.

DESCRIPTION

Figure 1:
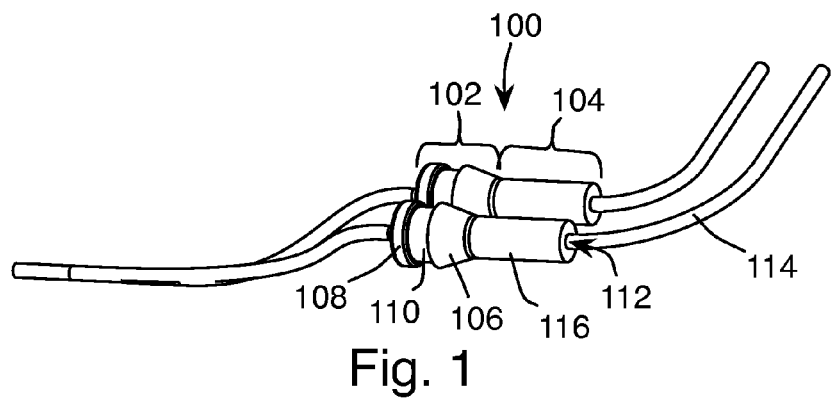
FIG. 1 shows a perspective view of gaskets with wires through them.

To reliably seal wiring holes in a more assembly-friendly way, the sealing gasket shown in FIG. 1 is disclosed. The gasket 100 has two main sections, the sealing section 102 and a grip section 104. The sealing section 102 consists of two flanges 106 and 108, the space between them defining a groove 110. The outer diameters of the flanges are sufficiently larger as to prevent the busing from leaving the hole after it is installed. The gap between the flanges, i.e., the width of the groove, is designed to match, or be slightly larger than the width of the wall. The gasket includes an inner bore 112 created when the gasket is molded around the wire 114. The outer diameter of the groove 110 is sized slightly larger than the hole through which the gasket and wire pass. The interference compresses all the parts, forming a seal. Thus, when the gasket is in place, with the wire in it, the gasket is in contact with both the wire and the edges of the hole, thus preventing air or water from passing through the hole. The stiffness of the gasket and wall materials and the amount of interference will determine the tightness of the seal.

In some examples, the gasket is made of an injection moldable rubber such as Alcryn® melt-processable rubber from Advanced Polymer Alloys of Carpentersville, Ill., having a hardness of 50 Shore A, and the wall is made of ABS plastic. The specific amount of interference between the dimensions of the groove and the hole needed will depend on the hardness of the material used for the gasket and the pressure levels to be contained.

The second section of the gasket 102 is the grip section 104. This section includes an extended tube portion 116 that extends the bore 114 to accommodate the wire 114. The outer diameter of the tube portion 116 is smaller than the diameter of the hole. At the end of the tube near the sealing section 102, the diameter increases, with the tube flaring out to match the outer diameter of the inner flange 106. This flare allows the gasket to be pulled through the hole by the grip section, compressing the inner flange 106 to pass through the hole, but preventing the gasket from backing out on its own or being pulled back out if the wire is pulled back. If it is desired that the gasket be removable, such as for service or rework during product assembly, the back flange 108 can be made thin enough that it can compress to be pulled through the hole, but thick enough that doing so requires more force than would be expected to act on the gasket in the course of normal operation.

In some examples, the gasket 100 is over-molded in place around the wire 114. As a result, the bore will precisely match the wire, so that the walls of the bore will press against the wire and exert a degree of friction resisting efforts to pull the wire. The total amount of friction will depend on the coefficient of friction between the materials and the amount of force that results from the intrinsic properties of the gasket material causing it to squeeze against the wire. The wire and gasket are then installed as shown in FIGS. 2A and 2B.

Figure 2A:
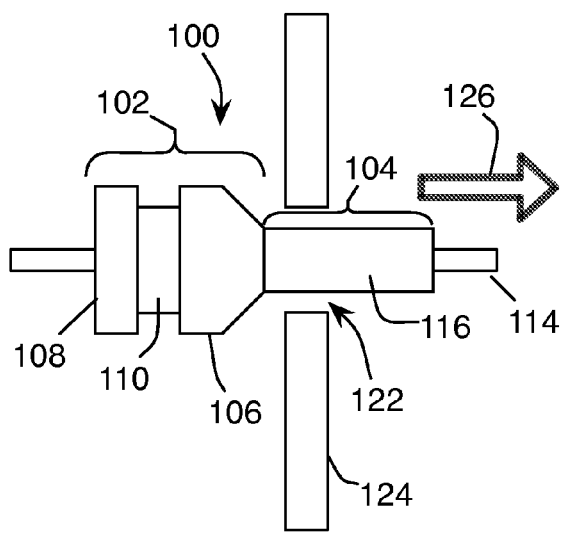
FIGS. 2A and 2B show the installation of the gasket of FIG. 1.
Figure 2B:
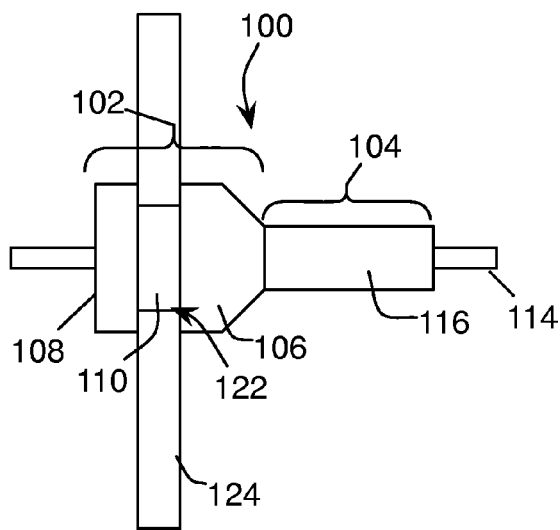

The gasket is pulled through the hole 124 in the wall 126, as shown in FIG. 2A. This is done by first threading the length of wire 114 extending beyond the grip section 104 through the hole, then feeding the tubular part 116 of the grip section itself through the hole as shown by arrow 126, and finally by pulling the tapered section and inner flange 106 through the hole, resulting in the completed assembly shown in FIG. 2B. If the friction between the wire and the inside of the gasket is high enough, the wire itself can be pulled on to pull the tapered part and the inner flange of the gasket through the hole. If the friction is not so great, or applying such force to the wire is not desirable, the grip section can be used to pull the inner flange 106 of the gasket through the hole. Once the gasket is seated, interference between the outer diameter of the groove 110 and the hole 122 may increase the compression of the gasket, increasing the frictional force between the gasket and the wire, which increases the amount of force applied to the wire that is transferred to the gasket. In addition to any friction between the gasket and the wall 124, the outer flange 108 serves to prevent the gasket from being pulled the whole way through the hole. Whether the wire is used to seat the gasket or not, it is preferable that the frictional force between them once the gasket is seated be less than the force required to pull the second flange of the gasket through the hole, so that pulling on the wire will not unseat the gasket.

Figure 3:
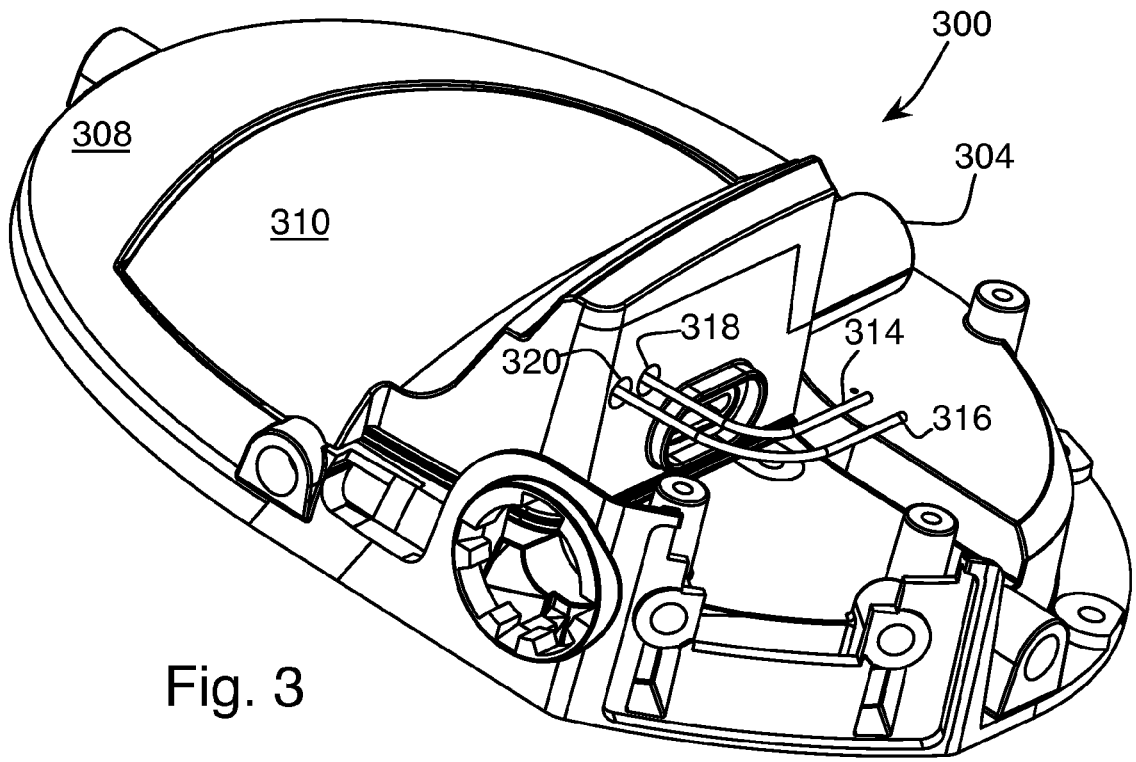
FIGS. 3 and 4 show a perspective view of a left outer casing of an acoustic noise reducing headphone.
Figure 4:
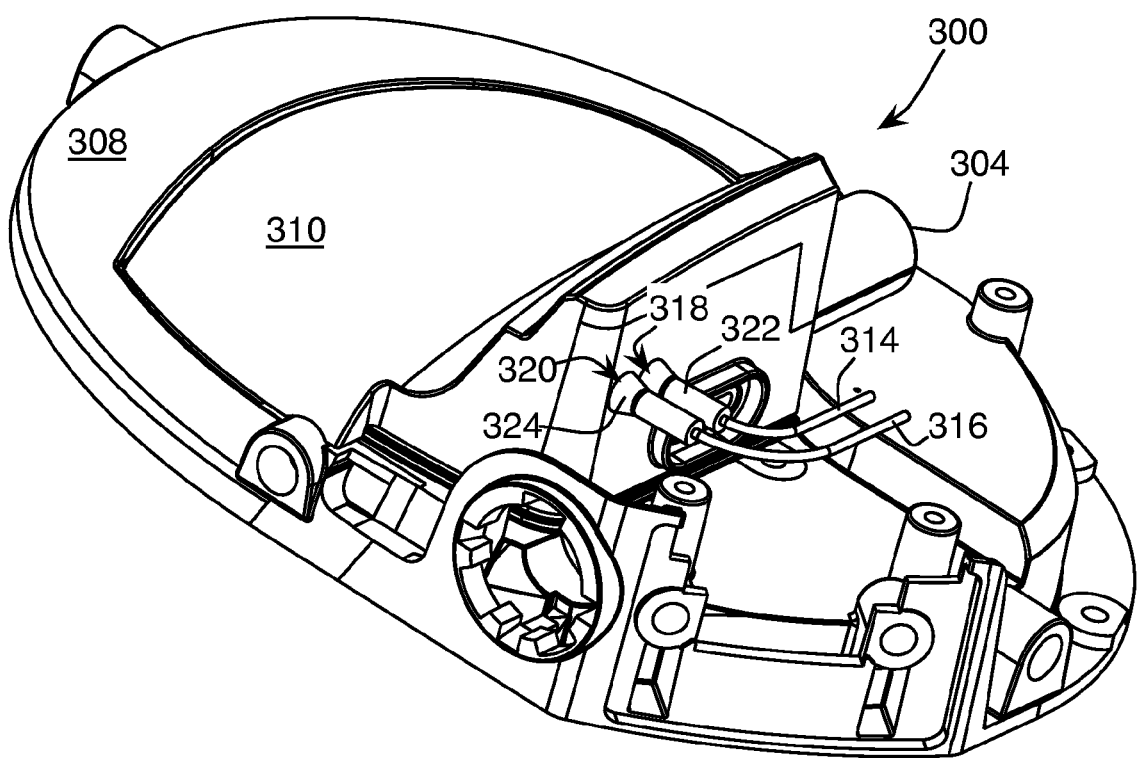
Figure 5:
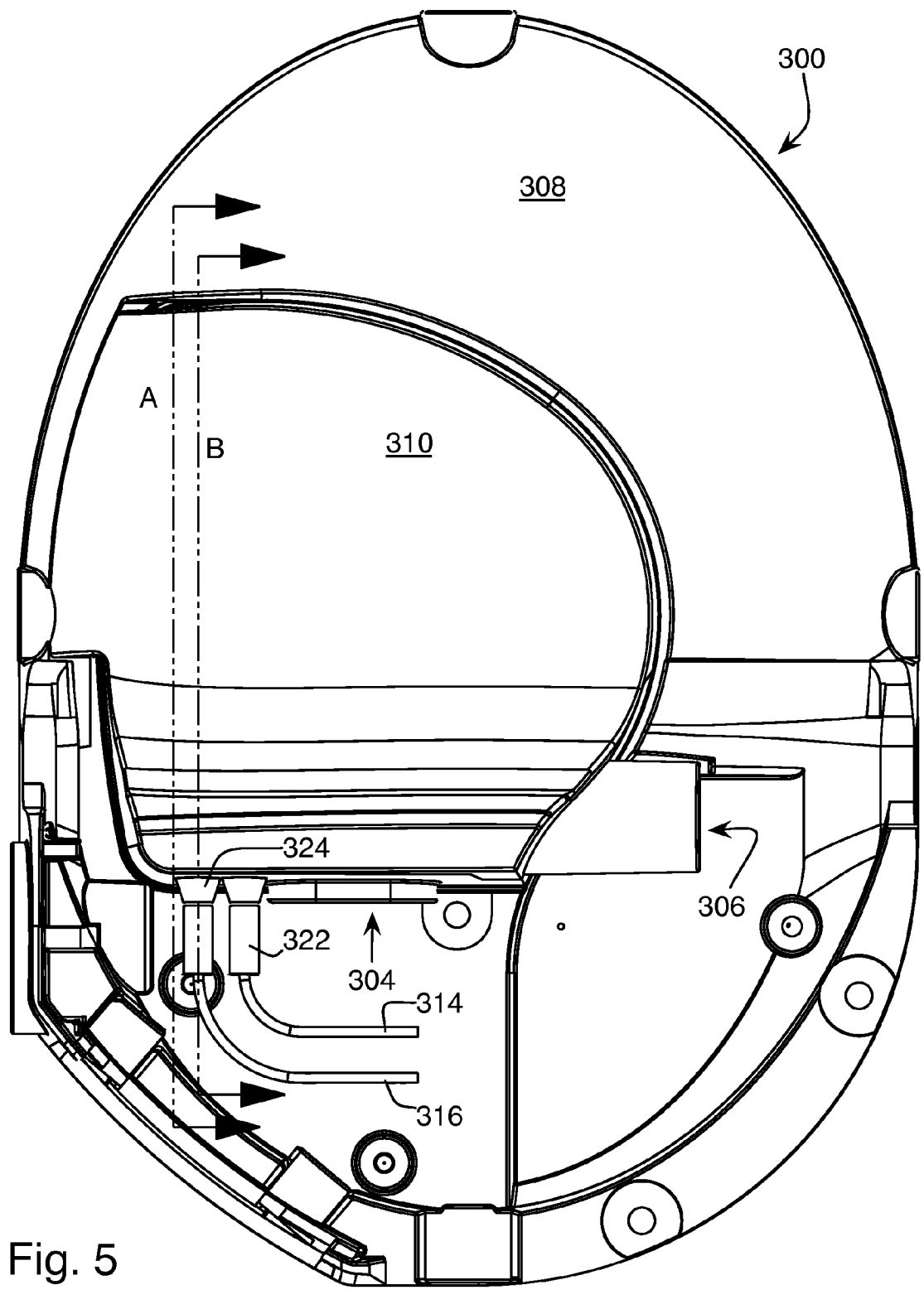
FIG. 5 shows a left side view of casing of FIG. 4.
Figure 6:
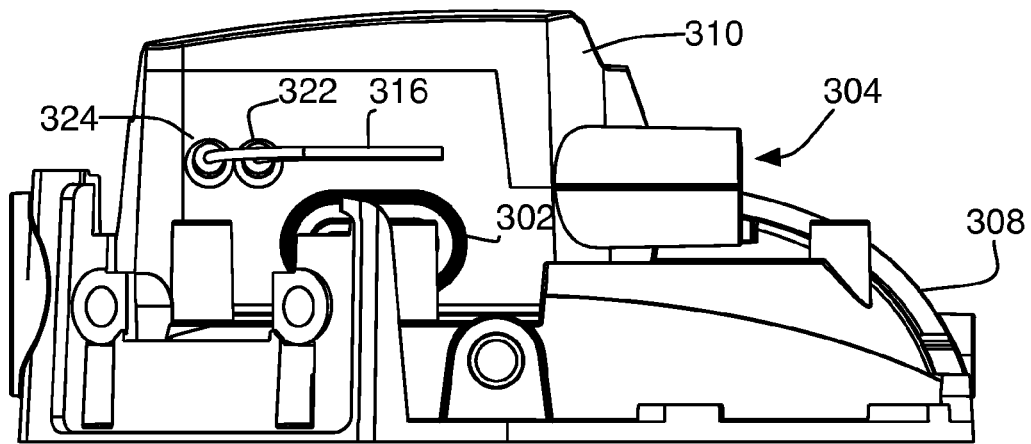
FIG. 6 shows a bottom end view of the casing of FIG. 4.
Figure 7:
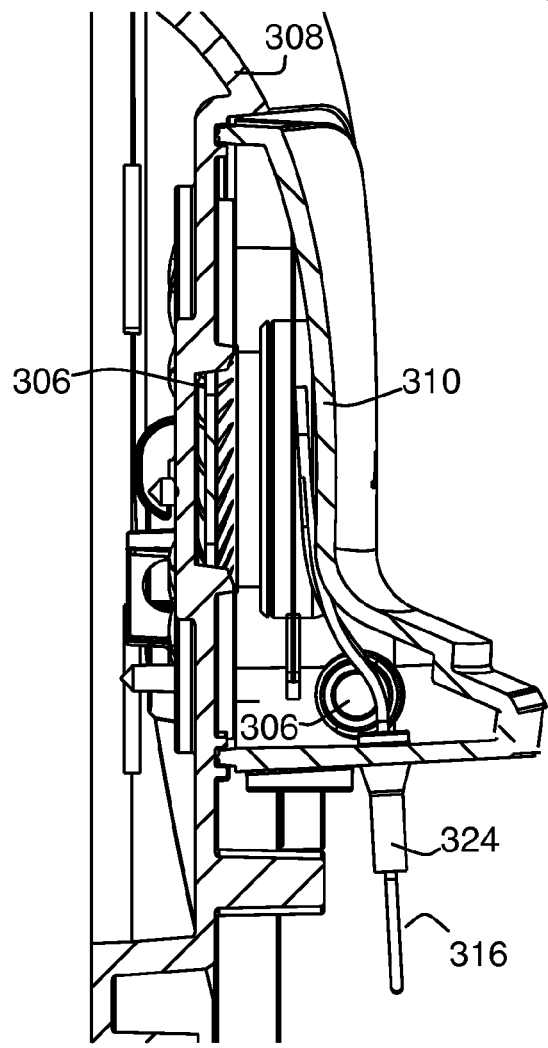
FIGS. 7 and 8 show cross-sectional views of the casing FIG. 4 from directions A and B, respectively, shown in FIG. 4.
Figure 8:
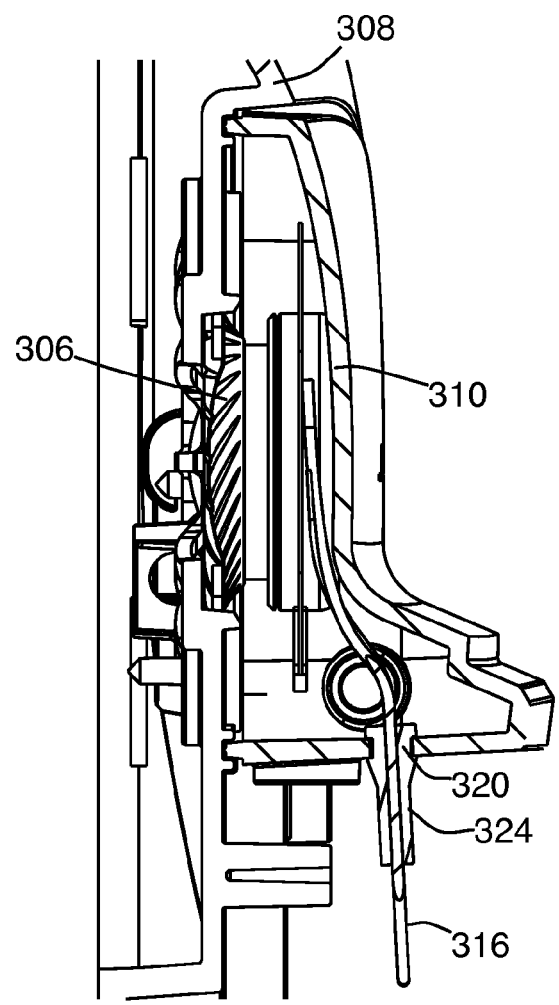

An actual implementation is shown in FIGS. 3 through 8. These figures show the outer shell 300 of a noise cancelling headphone having a partially sealed rear cavity. FIG. 3 shows the shell with the gaskets absent to better show the holes they will be used to plug. The other figures show the gaskets in place. A resistive port 302 and a reactive port 304 couple the rear cavity to the ambient air in a controlled manner. The driver 306, seen in cross-sectional views in FIGS. 7 and 8, is seated in a main body shell 308, and covered by a back cavity shell 310 to form the back cavity 312. Wires 314, 316 from the driver exit through holes 318, 320 in the back cavity shell 310 to reach electronics (not shown) outside the back cavity. Gaskets 322, 324 plug the holes 318, 320 in the manner described above.

Figure 9A:
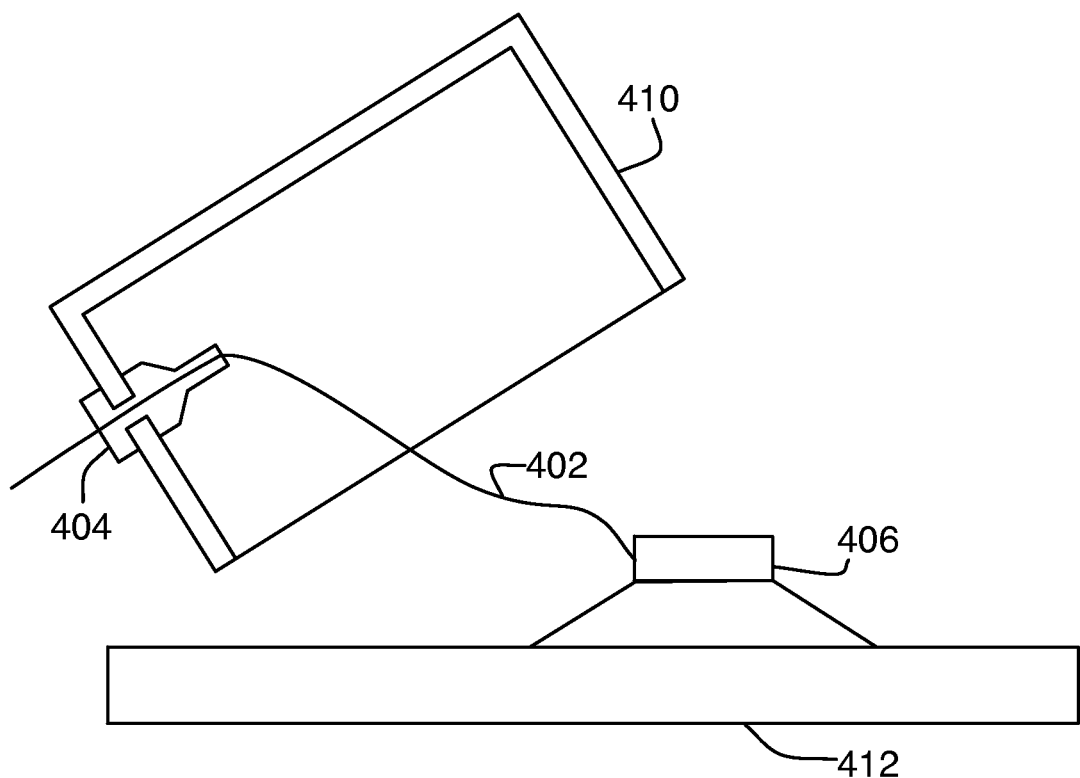
FIGS. 9A and 9B show a schematic representation of the installation of a casing including the gasket of FIG. 1.
Figure 9B:
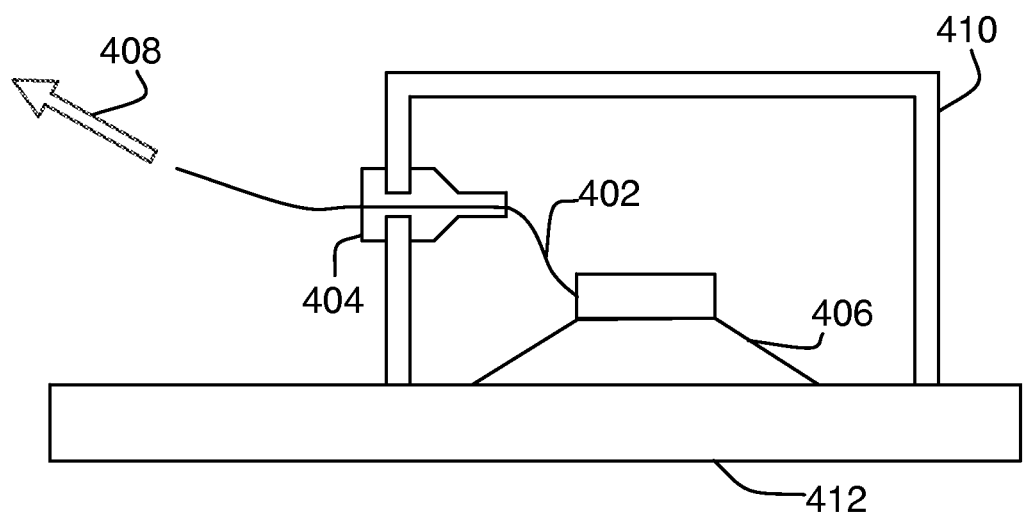
Figure 10:
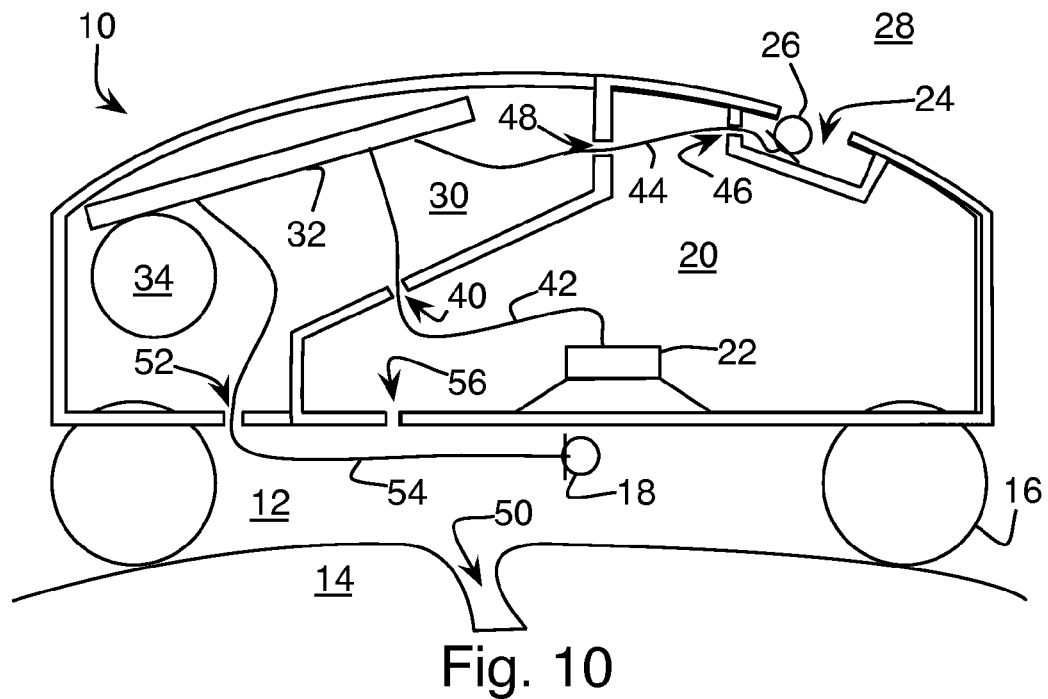
FIG. 10 shows a schematic cross-section diagram of a typical acoustic noise reducing headphone.
Figure 11:
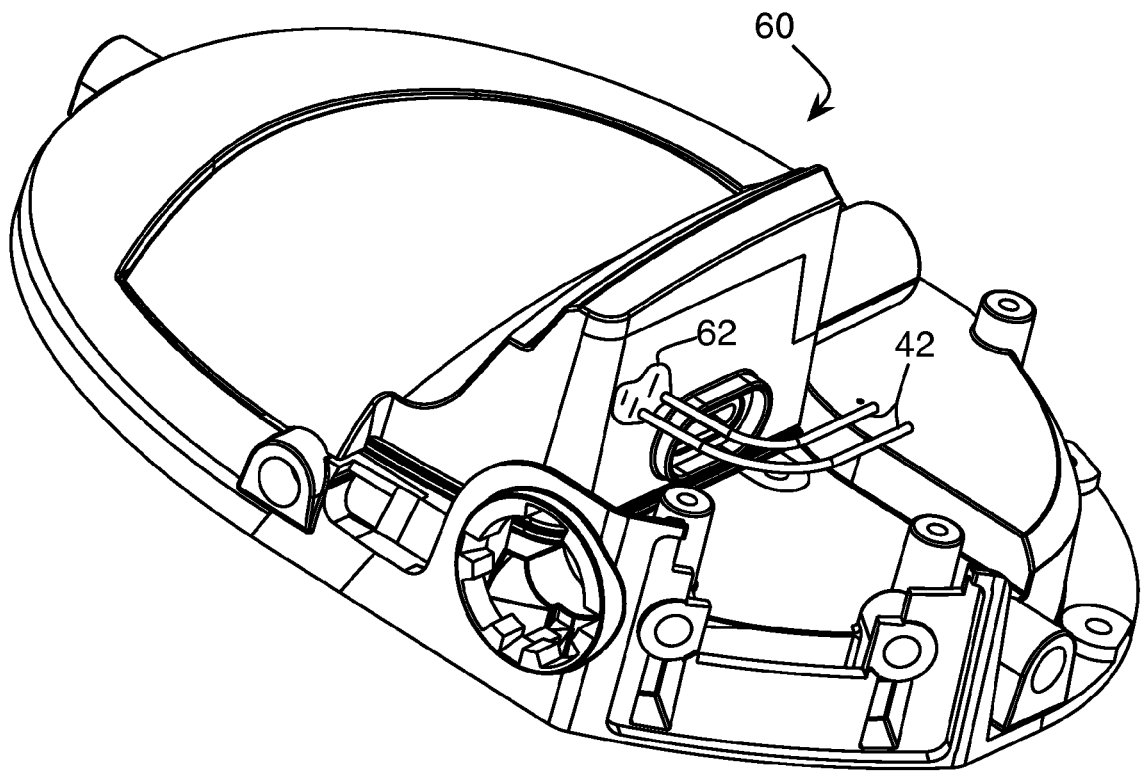
FIG. 11 shows the same view as FIGS. 3 and 4, with a prior art solution to plugging wiring holes.

The gasket just described provides an easy mechanism to seal a wiring hole without the use of RTV or other materials that are difficult to use and take time to set. The seal is formed as soon as the gasket is pulled into position, but it can be easily removed and replaced if needed. Another advantage comes from the fact that the gasket does not adhere to the wire. This is illustrated in FIGS. 9A and 9B. With an appropriately low degree of friction between the wiring and the gasket (arising from the materials used and the amount of interference between their dimensions), a first length 402 of wire can be pulled through the gasket 404 to allow easy access to the circuitry 406 to which the wire 402 will be attached, FIG. 9A. After the connection is made, the back cover 410 is attached to the mating surface 412, and the excess wire is pulled (arrow 408) back through the gasket, FIG. 9B. In such assemblies, the cover is generally attached to a mating surface in a way that seals the seam between them, such as ultrasonic welding, adhesive, or with a gasket around the entire edge of the part. Being able to pull the wire back through the hole without breaking the seal is particularly advantageous where the cover 410, once installed, prevents access to the electronics to which the wire is attached, such as the back cavity cover 310 discussed above.

The gasket described above is effective to prevent the flow of air between different chambers of a headphone, and between such chambers and the environment. The same design may also be effective in preventing the flow of water or other fluids through wiring holes in devices where one side of a hole may be exposed to the fluid, and it is desired to exclude the fluid form the other side. One example, in particular, is in providing an exit path for headphone wires from inside a water-tight case for an electronic device such as a mobile phone or music player.

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus comprising:
   an enclosure having a wall separating a first volume from a second volume;
   the wall defining a hole having a diameter and allowing passage between the first volume and the second volume;
   a wire passing through the hole; and
   a gasket surrounding the wire at the hole,
   the gasket comprising:
      a first section including a groove between a first flange and a second flange, the groove having an outer diameter matched to the diameter of the hole and the flanges having outer diameters greater than the diameter of the hole,
      a second section adjacent the first flange and including a tubular portion having a diameter less than the diameter of the hole, and a tapered section smoothly transitioning from the diameter of the tubular portion to the diameter of the first flange, and
      a bore passing through the first and second sections and having an inner diameter matched to the diameter of the wire;
   the gasket preventing flow of fluid through the hole between the first volume and the second volume; wherein
   the diameter of the bore and the coefficient of friction solely between the gasket and the wire are such that before being positioned in the hole, the force required to pull the wire through the gasket is more than the force required to pull the tapered section and the first flange of the gasket through the hole, and
   the diameter of the bore, the outer diameter of the groove, and the coefficient of friction solely between the gasket and the wire are such that when positioned in the hole, the force required to pull the wire through the gasket is less than the force required to pull the second flange of the gasket through the hole.

2. The apparatus of claim 1 wherein the gasket prevents the flow of air through the hole.

3. The apparatus of claim 1 wherein the gasket prevents the flow of water through the hole.

4. The apparatus of claim 1 wherein the gasket has a hardness of 50 Shore A.

5. The apparatus of claim 1 wherein the outer diameter of the groove is greater than the diameter of the hole.

6. The apparatus of claim 1 wherein the enclosure comprises the body of a headphone,
   first volume is a back cavity of the headphone containing the back side of an acoustic driver, and
   the outer diameter of the groove and the coefficient of friction between the gasket and the side wall of the hole are such that when the gasket is positioned in the hole, the force required to push the second flange of the gasket through the hole is greater than the acoustic pressures produced inside the first volume by operation of the acoustic driver.

7. The apparatus of claim 1 wherein the enclosure comprises the body of an active noise reducing headphone having an acoustic driver, and
   the first volume comprises a back cavity containing a first side of the acoustic driver, and
   the second volume is open to free space around the headphones.

8. The apparatus of claim 1 wherein the enclosure comprises the body of an active noise reducing headphone having an acoustic driver, and
   the first volume comprises a back cavity containing a first side of the acoustic driver, and the second volume comprises a front cavity coupling a second side of the acoustic driver to the ear of a user when the headphones are worn.

9. The apparatus of claim 1 wherein the enclosure comprises the body of an active noise reducing headphone having an acoustic driver, and
   the first volume comprises a front cavity coupling a first side of the acoustic driver to the ear of a user when the headphones are worn, and the second volume is open to free space around the headphones.

10. The apparatus of claim 1, wherein the enclosure comprises a water-tight case for a mobile electronic device,
the first volume comprises the interior of the case, and
the second volume comprises free space around the case.

\* \* \* \* \*